Nov. 11, 1969    W. I. WORKMAN    3,477,731
HIGH PRESSURE SEAL
Filed Feb. 20, 1967

United States Patent Office 3,477,731
Patented Nov. 11, 1969

3,477,731
HIGH PRESSURE SEAL
Woodrow Irwin Workman, Laconia, N.H., assignor to International Packings Corporation, Bristol, N.H., a corporation of New Hampshire
Filed Feb. 20, 1967, Ser. No. 617,108
Int. Cl. F16j 15/32, 15/54
U.S. Cl. 277—58         9 Claims

ABSTRACT OF THE DISCLOSURE

A radial seal for shaft to bore sealing against a high pressure fluid medium including an annular resilient member having a first section for engaging the bore, and a second for engaging the shaft; a frusto-conical reinforcing member engages a third section of the resilient member. The external conical surface of the reinforcing member is in contact with the resilient member and the internal conical surface is facing away from the resilient member and the high pressure medium, the internal conical surface being in compression, and the external in tension for resisting deformation.

---

This invention relates to improved radial seals, particularly those used in high pressure installaitons.

Conventional radial seals employ tubular lips which extend axially of the shaft to be sealed. Often a garter type spring is used to improve the contact of the sealing lip with the shaft. Such seal configurations permit the pressure of the medium being sealed to act against the exterior of the sealing lip, flexing it towards the shaft, causing high friction between shaft and sealing lip. The combination of the flexing, axial scrubbing, and torsional strain produced as the shaft is turned, causes the sealing lip to fail prematurely. Some such seals have undercut or irregular sealing lips or adjacent sections which can act as fulcrums about which the sealing lip can bend, impairing the delicate contact between lip and shaft. Many such seals have a large contact area with the shaft to be sealed that causes additional loading on the shaft, and have sealing lips that tend to wear to feather edges that crumble and interfere with the sealing action. Reinforcing members used on the low pressure side of such seals are inefficient, as the pressure of the sealed medium acts on them causing them to bulge away from the sealing lip and sealed medium, thereby impairing their reinforcing ability. In addition the bulging deforms the reinforcing member so that its inner periphery is drawn away from the shaft, allowing the resiilent sealing member to be deformed into that space. When the pressure decreases the portion of the resilient seal member deformed into the space between the shaft and reinforcing member may be pinched as the reinforcing member resumes its normal position. The function of dust lips secured to such deformable reinforcing members is impaired when the lips are drawn away from the shaft or bore by the deformation of the reinforcing member.

It is therefore a primary object of this invention to provide a radial seal in which deleterious effects of the pressure of the medium being sealed on the sealing lip are substantially reduced, the contact of the sealing lip with the shaft sealed is minimal, the sealing lip tends to wear without feathering edges; and the reinforcing member is highly resistant to axial bulging under pressure of the medium sealed.

It is a further object of this invention to provide such a seal which may be made to impart very low rotational drag to the sealed shaft at low pressure, while substantially preserving the benefits of the basic seal.

It is a further object of this invention to provide such a seal which is simple, inexpensive to manufacture, and highly effective.

The invention is accomplished by a radial seal for shaft to bore sealing including an annular resiliently deformable member having a first section for engaging the bore and a second for engaging the shaft; a rigid frusto-conical reinforcing member having its end closely spaced from the shaft engages a third section of the resilient member. The external conical surface of the reinforcing member is in contact with the resilient member and the internal conical surface is facing away from the resilient member and the high pressure medium, the internal conical surface being in compression and the external in tension for resisting deformation.

Other preferred embodiments include a reinforcing member conforming with the second wall of the resilient member, an annular recess extending generally axially of the shaft from the first wall toward the second wall between the sealing lip and generally cylindrical outer surface, and a toe gasket formed integrally with the resilient member at the junction of the first wall and generally cylindrical outer surface.

Other objects, features, and advantages will appear from the following description of a preferred embodiment of the invention, taken together with the attached drawings thereof, in which.

Figure 1:
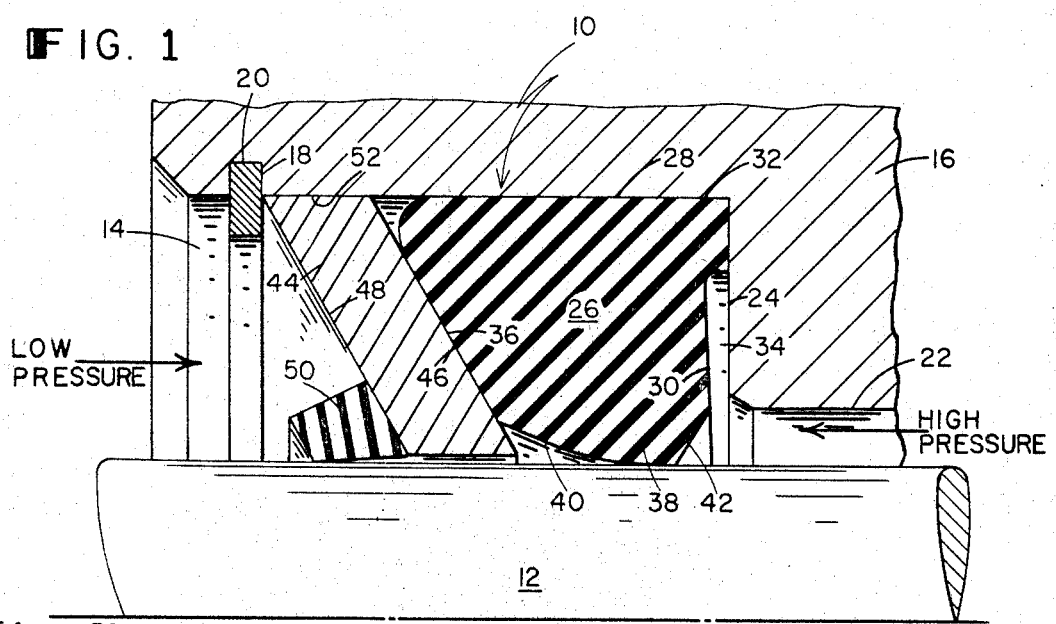
FIG. 1 is a sectional view of a radial seal in accordance with this invention installed on a shaft in a bore.

There is shown in FIG. 1 a radial seal 10 mounted on shaft 12 in bore 14. Bore 14 is formed in housing 16 and is partially closed by retaining ring 18 set in groove 20. Shaft 12 passes through smaller bore 22 in the end wall 24 of bore 14.

Resilient member 26, the primary sealing element, has a generally cylindrical outer surface 28 of slightly larger diameter than bore 14 for retaining member 26 non-rotatively in bore 14. Wall 30 extends from outer surface 28 radially inwardly toward shaft 12. At the junction of outer surface 28 and wall 30 is toe gasket 32 integral with member 26 and extending radially beyond outer surface 28 and axially beyond wall 30, thereby causing an inward radial pressure on member 26 and providing a space 34 between wall 30 and base 24 of bore 14. Space 34 permits the medium sealed to the right of seal 10 to encounter a larger surface of the seal so that the force exerted by the pressurized medium tends to move the seal along the shaft rather than set up a rotational moment that would hold it against the shaft with greater force, as would be the case if only the lower part of wall 30 adjacent to bore 22, encountered the pressure of the medium. Frusto-conical wall 36 extends radially inwardly from outer surface 28, and between walls 30 and 36 is sealing lip 38 formed by the intersection of faces 40 and 42.

Preferably face 40 extends radially inwardly from wall 36 at an acute angle of 20 degrees to the axis of shaft 12, while face 42 extends radially inwardly from wall 30 at an acute angle of 30 degrees to wall 30, thereby providing an obtuse angle of 100 degrees at sealing lip 38. An obtuse angle is there preferred to avoid feathering of the lip as it wears; feathering produces residue that may interfere with operation of the seal.

Frusto-conical base washer 44 has its external conical surface 46 abutting frusto-conical wall 36 of member 26 and has at its internal conical surface 48 an annular resilient dustlip 50 which engages shaft 12 and keeps dust from entering between washer 44 and the shaft. The frusto-conical shape of washer 44 causes it to be placed in compression by forces exerted by the sealed medium, as opposed to tension, which prevents bulging of the washer. Dustlip 50 maintains a wiping action on shaft 12, while the outer edge 52 of the rigid reinforcing washer 44 engages bore 14 and abuts retaining ring 18, holding it in position with its inner edge closely spaced from the shaft and preventing its movement in a direction away from the high pressure fluid. Forces produced on wall 30 by the high pressure fluid tend to drive member 26 to the left in FIG. 1 and up the inclined plane of surfaces 36 and 46, while the frusto-conical surface of the washer with its inner conical surface facing away from the high pressure fluid presents high resistance to deformation.

Figures 2, 3:
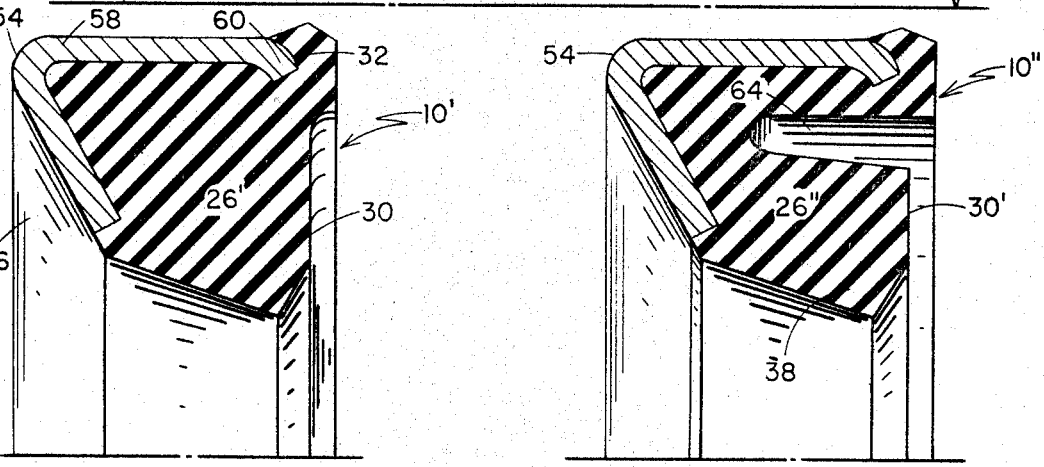
FIG. 2 is a sectional view of the resilient member of the seal of this invention in its free state.
FIG. 3 is a sectional view of a modified form of the resilient member of FIG. 2.

In seal 10', FIG. 2, reinforcing member 54, rigid and preferably metal, may be imbedded in member 26' so that its frusto-conical section 56 and generally cylindrical section 58 form a portion of wall 36 and outer surface 28, respectively. Cylindrical section 58 may be formed with a radial lip 60 that turns into member 26' for greater bonding strength and easier insertion of the seal in bore 14.

Figure 4:
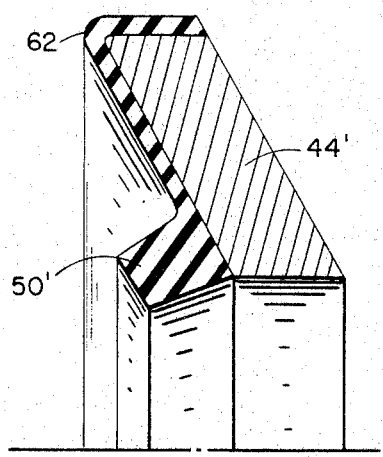
FIG. 4 is a sectional view of a modified form of base washer similar to the one shown in FIG. 1 in its free state.

An alternative construction of base washer 44, FIG. 4, uses a base washer 44', slightly less in diameter than base washer 44 so that the thickness added by gasket 62 integral with dustlip 50' makes the overall diameter of the unit in FIG. 4 slightly larger than that of bore 14 to insure a snug, leak-tight fit.

Certain applications require a seal with all the advantageous features of the formerly described seal, but in addition requires that the seal exert very low torque on shaft 12 at zero pressure.

Seal 10", FIG. 3, employs the basic design of seals 10 or 10', but uses an annular recess 64 in resilient member 26", opening on wall 30', to relieve a portion of the force imparted to lip 38 by the mass of the resilient member.

In operation, referring to FIG. 1, low pressure is present at surface 48 and high pressure at wall 30. The member 26, under high pressure, being resilient, will transfer force in more than one direction, but by having the inclined surface 46 in FIG. 1 or the combination of surface 46 in conjunction with the inner leg 56 in FIG. 2, the force is directed to some extent away from the surface of shaft 12 and toward surfaces 46 and 14.

Other embodiments will occur to those skilled in the art and are within the following claims:

What is claimed is:

1. A radial seal for shaft to bore sealing against a high pressure fluid medium comprising:
    an annular resilient member, having a generally cylindrical outer surface contacting said bore, a first wall generally perpendicular to said shaft, a second wall, and a sealing lip formed by the intersection of a first face extending radially inwardly from said first wall and toward said second wall at an acute angle to said first wall, a second face extending radially inwardly of said second wall and toward said first wall at an acute angle to the axis of said shaft, the angle of intersection of said faces being obtuse, and a rigid annular reinforcing member having a first section coextensive with and abutting said second wall, said first section supporting said second face throughout its length, said second wall said first section extending generally radially inwardly and inclined toward said first wall providing frusto-conical surfaces having their inner conical surfaces facing away from said high pressure medium.

2. The seal of claim 1 in which said reinforcing member has a second section extending from said first section coextensive with said generally cylindrical outer surface.

3. The seal of claim 1 in which said first section is imbedded in said second wall and extends slightly less far radially inwardly than said second wall.

4. The seal of claim 2 in which said second section is imbedded in said generally cylindrical outer surface and terminates in a radially inwardly turning lip further imbedded in said resilient member.

5. The seal of claim 1 in which said first section is frusto-conical in shape, the external frusto-conical surface being in contact with said resilient member, and the internal frusto-conical surface facing away from said resilient member, said shape causing said internal frusto-conical surface to be compressed by the pressure of the medium sealed and to present high resistance to bending by said pressures.

6. The seal of claim 1 further comprising a frusto-conical base washer braced against axial movement in said bore and having its external frusto-conical surface in abutting relationship with said second wall of said resilient member.

7. The seal of claim 6 further comprising a resilient annular dust lip engaging said shaft and connected with the surface of said washer opposite said resilient member.

8. A radial seal for shaft to bore sealing against a high pressure fluid medium comprising:
    an annular resiliently deformable member having an outer cylindrical wall for engaging said bore, an inner wall having a sealing lip, a frusto-conical interconnecting wall therebetween on the side of said member away from said high pressure medium with an inner conical surface facing away from said high pressure medium and an interconnecting wall spaced therefrom in a direction toward said high pressure medium and extending between said sealing lip and said outer wall
    a rigid annular reinforcing member having a frusto-conical surface in contact with said frusto-conical wall of said resiliently deformable member with the outer peripheral edge of said reinforcing member closely adjacent said bore and the inner peripheral edge of said reinforcing member closely adjacent and spaced from said shaft at an end of said inner wall of said resiliently deformable member having said sealing lip and
    means engaging said bore preventing movement of said reinforcing member in a direction away from said high pressure medium
    whereby deformation of said resiliently deformable member upon application of said high pressure fluid tends to occur in a radially outward direction along said frusto-conical surfaces, said frusto-conical surface of said reinforcing member presenting high resistance to deformation of said reinforcing member.

9. A radial seal as claimed in claim 8 further including a resilient annular dust lip member sealingly connected to said reinforcing member and engaging said shaft on the side opposite to said resiliently deformable member.

References Cited

UNITED STATES PATENTS

| 2,600,516 | 6/1952 | Pielop | 277—212 |
| 2,834,616 | 5/1958 | Gebert et al. | 277—212 X |
| 3,106,405 | 10/1963 | Pringle | 277—153 |
| 3,117,796 | 1/1964 | Liebig | 277—205 |
| 3,215,205 | 11/1965 | Sizer | 277—121 X |

FOREIGN PATENTS 972,155    5/1959   Germany.

LAVERNE D. GEIGER, Primary Examiner

JEFFREY S. MEDNICK, Assistant Examiner

U.S. Cl. X.R.

277—188, 212, 235